(12) United States Patent
Darwish (10) Patent No.: US 8,325,362 B2
(45) Date of Patent: Dec. 4, 2012

(54) CHOOSING THE NEXT DOCUMENT

(75) Inventor: Kareem Mohamed Darwish, Cairo (EG)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 12/342,105

(22) Filed: Dec. 23, 2008

(65) Prior Publication Data

US 2010/0157354 A1 Jun. 24, 2010

(51) Int. Cl.
*G06F 3/12* (2006.01)
*G06F 3/00* (2006.01)
*G06F 7/00* (2006.01)

(52) U.S. Cl. .......................... 358/1.15; 715/500; 707/5

(58) Field of Classification Search .................. 715/500; 358/1.15; 707/5
See application file for complete search history.

(56) References Cited

U.S. PATENT DOCUMENTS

| | | | |
|---|---|---|---|
| 6,301,577 | B1 | 10/2001 | Matsumoto et al. |
| 7,137,067 | B2 | 11/2006 | Yanase et al. |
| 7,284,191 | B2 | 10/2007 | Grefenstette et al. |
| 2003/0130994 | A1 | 7/2003 | Singh et al. |
| 2005/0022106 | A1* | 1/2005 | Kawai et al. ............. 715/500 |
| 2006/0212415 | A1 | 9/2006 | Backer et al. |
| 2007/0299872 | A1 | 12/2007 | Bier |
| 2008/0114750 | A1 | 5/2008 | Saxena et al. |
| 2009/0210407 | A1* | 8/2009 | Freire et al. ............. 707/5 |

OTHER PUBLICATIONS

Popescul, et al., "Probabilistic Models for Unified Collaborative and Content-Based Recommendation in Sparse-Data Environments", Retrieved at <<http://www.cis.upenn.edu/datamining/Publications/popescul01probabilistic.pdf>>, Proceedings of the Seventeenth Conference on Uncertainty in Artificial Intelligence (UAI-2001), Morgan Kaufmann, San Francisco, 2001, pp. 8.
Budzik, et al., "Beyond Similarity", Retrieved at <<http://dent.infolab.northwestern.edu/infolab/downloads/papers/paper10095.pdf>>, Working notes of the AAAI 2000 Workshop on AI for Web Search (Austin, TX USA), Jul. 2000, AAAI Press, pp. 6.
Muller, Christine, "Towards an Interactive and Collaborative Reader for Mathematical Documents", Retrieved at <<http://www.kwarc.info/cmueller/papers/Mueller_ResearchProposal_2007-03-14.pdf>>, Mar. 2007, pp. 1-28.
Burke, Robin, "Hybrid Recommender Systems: Survey and Experiments", Retrieved at <<http://josquin.cs.depaul.edu/~rburke/pubs/burke-umuai02.pdf>>, User Modeling and User-Adapted Interaction, 12(4):331-370, Nov. 2002, pp. 1-29.
Yousri, et al., "Pattern Cores and Connectedness in Cancer Gene Expression", Proceedings of the 7th IEEE International Conference on Bioinformatics and Bioengineering, BIBE 2007, Oct. 14-17, 2007, pp. 100-107, Boston, Mass.

* cited by examiner

*Primary Examiner* — Charlotte M Baker
*Assistant Examiner* — Justin Katzwhite (57) ABSTRACT

In one example, a system may suggest an order in which to read documents in a set. When a person has read a document in the set, the system may suggest the next document to read. The next document may be selected based on criteria such as the document's dissimilarity from the document(s) that have already been read. Choosing, as the next document, a document that is dissimilar from documents that have already been read exposes the reader to new information, thereby enhancing the reader's return on investment for the time spent reading the documents.

17 Claims, 5 Drawing Sheets

CHOOSING THE NEXT DOCUMENT

BACKGROUND

Sets of documents typically exist in an order. For example, a pre-existing collection of documents (e.g., a legal case file, a police file, etc.) is typically organized in chronological or reverse-chronological order. As another example, search results are normally presented in descending order of relevance to a query.

People typically read a set of documents in the order in which they are presented. However, it may be inefficient to read the documents in this order. Documents that appear near each other in the given order may contain redundant information, and reading several documents that have the same, or similar, information provides the reader with relatively little new information for the amount of time invested.

SUMMARY

For a given set of documents, an order may be suggested in which to read the documents. The order may be chosen to enhance the amount of information that the reader gains for his or her investment of time. For example, when a document has been read, the next document may be chosen to be one that is dissimilar to the one that has already been read. Or, if several documents have been read, a centroid may be found that represents the combined content of the various documents that have been read, and the next document to be read may be chosen to be one that is dissimilar from the centroid. By choosing, as the next document, one that is dissimilar from what has already been read, the reader is likely to be presented with new information rather than repetitive information. In this way, the reader is likely to learn a relatively large amount of information for a given amount of time invested in reading the documents.

The next document to be read may be chosen to maximize dissimilarity with what has already been read, but could be chosen based on other criteria. For example, a limit on dissimilarity may be set, so that the next document is chosen to be the one that has the greatest dissimilarity to the previously-read document(s) without exceeding the limit. When a reader is learning about a new topic, some redundancy among successive documents might be helpful to reinforce the reader's understanding, so a limit on dissimilarity could be used when the reader is reading about a topic that is new to him or her. As another example, documents in a set could be clustered based on their relative similarity to each other, and documents to read could be chosen successively from each cluster so that the reader would be exposed to a document from each cluster.

The reader could be allowed to tune the manner in which the next document is selected. For example, the reader could set minimum and/or maximum limits on the amount of dissimilarity that the next document is to have as compared with the document(s) that have been read.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In various contexts, a person may be presented with a set of documents to read. The set of documents could be the results of a search (or could be chosen based on filtering techniques), or a pre-existing set of documents (e.g., the documents in a legal case file). Typically, the documents are presented to the person in some order. For example, search results are normally presented in order of their relevance to the query from which they are generated. The documents in a file (whether an electronic or paper file) often exist in chronological or reverse-chronological order.

In some cases, it makes sense to read the documents in the order in which they naturally exist—e.g., the order in which they appear in search results, the chronological or reverse-chronological order of a case file, etc. But different documents that appear near each other in this order may contain redundant information, so reading the documents in order may convey information to the reader inefficiently, which provides a low information return for the reader's time investment. For example, if the documents are obtained in response to a search, and if those documents are presented in order of relevance to the search query, the first five documents may contain similar information to each other. Similarly, if documents have been chosen from a collection using filtering techniques, the documents may be presented in some order that is based on how well the documents satisfy the filter. Thus, reading the first five documents in the order of the search results may be an inefficient way for a reader to learn a topic. After a document has been read, it may make sense to read a document that is dissimilar to what has been read, rather than reading another document that contains more of the same.

The subject matter herein may be used to select the next document to read. Given one or more documents that a person has already read, systems using the subject matter herein may choose another document that is dissimilar to one or more of the documents that have been read. Such systems may suggest the dissimilar document as the next one to read.

Figure 1:
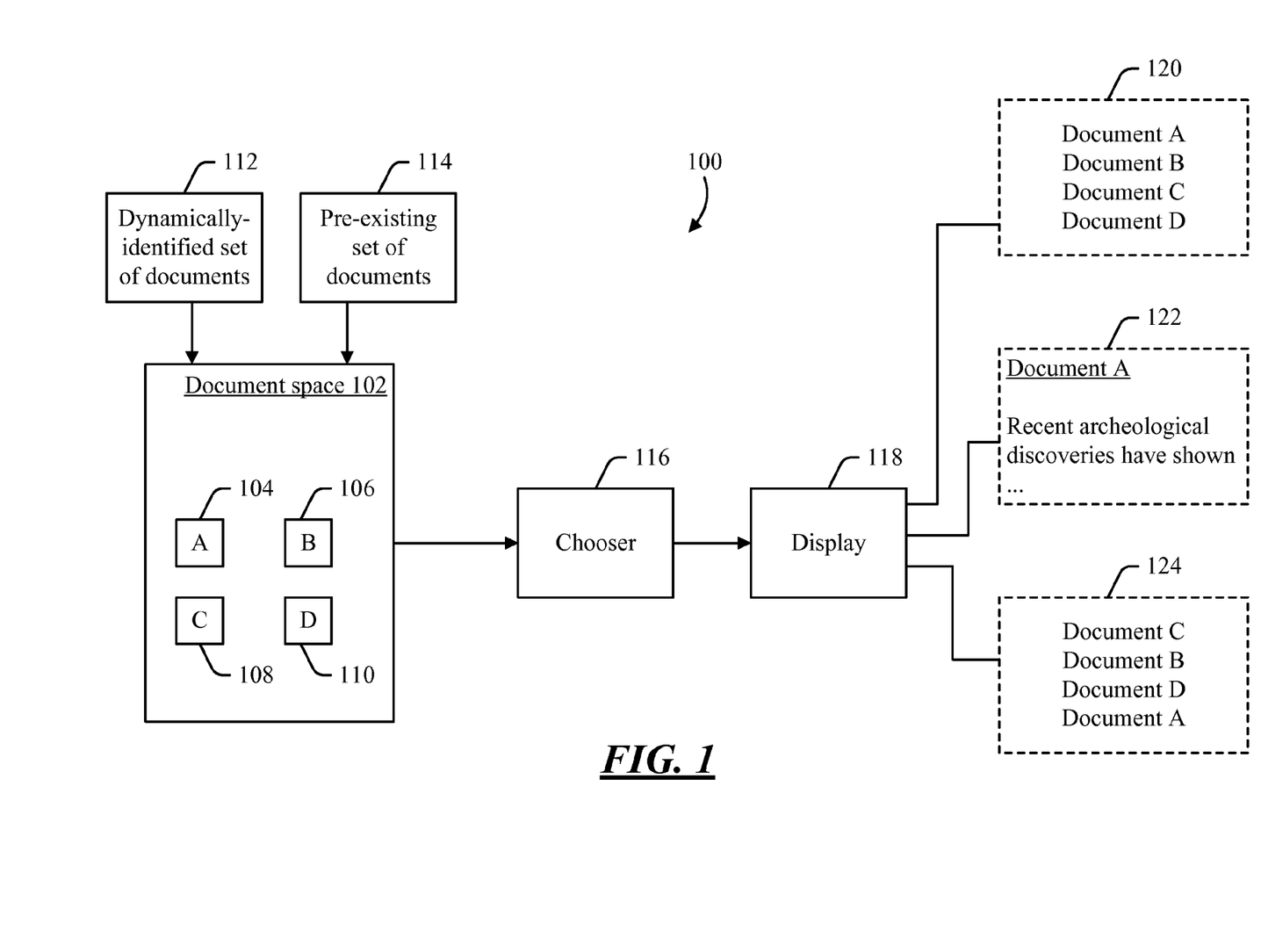
FIG. 1 is a block diagram of an example system in which an order of documents may be chosen.

Turning now to the drawings, FIG. 1 shows an example system 100 in which an order of documents may be chosen. Document space 102 is a set of documents, such as documents 104, 106, 108, and 110 (labeled "A", "BB", "C", and "D", respectively). Four documents 104-110 are shown, although document space 102 could include any number of documents. Documents 104-110 may take any form. For example, documents 104-110 could be electronic documents, paper documents, electronic images (or other representations) of paper documents, etc.

The documents in document space 102 may be a dynamically identified set of documents (block 112), or may be a pre-existing set of documents (block 114). Search results are an example of a dynamically-identified set of documents. If a person enters a query into a search engine, the search engine identifies documents that respond to the query, even though those documents may not have previously been part of a collection. In this sense, the search results define a set of documents that have been dynamically identified. The documents identified in the search results are an example of document space 102. Documents that have been obtained through filtering techniques are another example of a dynamically-identified set of documents. With filtering techniques, a model may be built as to what kind of documents a person is looking for, and the model may then be applied to a collection of documents in order to choose certain documents from the collection. One way of building this model is for a person to run an initial query with a search engine, and then have the person provide feedback on which of the results are relevant. Machine learning techniques may then be used to determine what the person is looking for and to build an appropriate model. The model can then be applied to a collection of documents, in order to filter from that collection those documents that appear to be what the person is looking for. Learning from user feedback is one technique for building a model, although other techniques could be used.

In some cases, documents have been collected or grouped together prior to any particular search for information. For example, a law office may maintain a file pertaining to each court matter the office is handling, or a police department may maintain a file pertaining to the investigation of a particular crime. In these cases, each pleading or report in the file may be one document, and the file containing a particular set of pleadings and/or reports may be a document space. Since such a file groups documents together in advance of any particular search request, such a file may be viewed as a pre-existing set of documents. The subject matter described herein applies to any document space, whether that space is composed of a dynamically-identified set of documents or a pre-existing set of documents.

Chooser 116 determines which document to suggest as the next one to read. Given a document space 102, and some information as to which documents in the space have been read and which ones have not been read, chooser 116 determines which document to suggest as the next document to read. Chooser 116 may be implemented as software, but may also be implemented in any other manner.

Display 118 may be controlled by chooser 116 (or by a computer on which chooser 116 is implemented). Display 118 may show, in some manner, an indication of the next document to read, where that document has been identified by chooser 116. Such an indication, as well as the document itself, may be viewable on display 118. Thus, for example, chooser 116 might initially suggest document A as the first document to read. After a person reads document A, chooser 116 might suggest document C as the next one to read. FIG. 1 shows examples of content that might be shown on display 118 at various points in time. Initially, display 118 shows a list of documents in which document A is at the top (block 120). A person might choose to read document A (e.g., by clicking on the words "Document A" to follow a link), and would then be shown the content of document A (block 122). After reading document A, the person could be shown a new screen (block 124), in which the next document suggested for reading (document C) is at the top of the list. The person could then read the suggested document, and so on.

FIG. 1 shows an example in which the document to read next is shown by presenting a list of documents in a space, where the document that is suggested as the next one to read is presented at the top of the list. However, the next document suggested for reading could be presented and/or identified in any manner. For example, the person could simply be shown documents in the order chosen. Such a system might show the first document on display 118, along with a "next" button. When a person clicks the "next" button, the next document suggested for reading could be shown on display 118.

Figure 2:
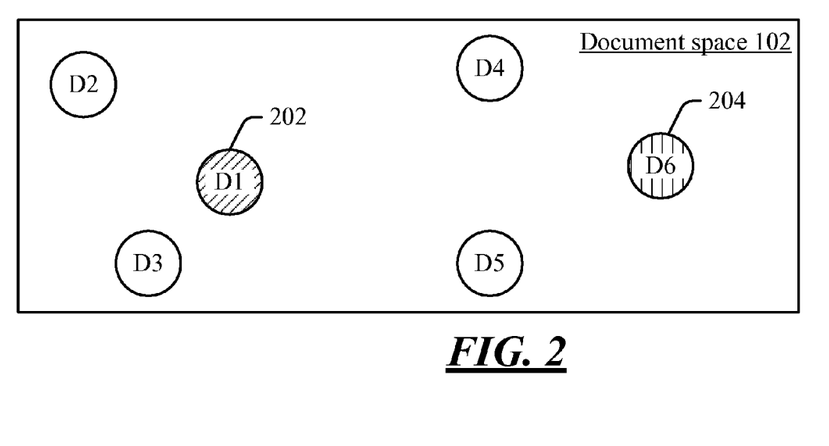
FIGS. 2-4 are block diagrams showing example ways to choose the next document to read.
Figure 3:
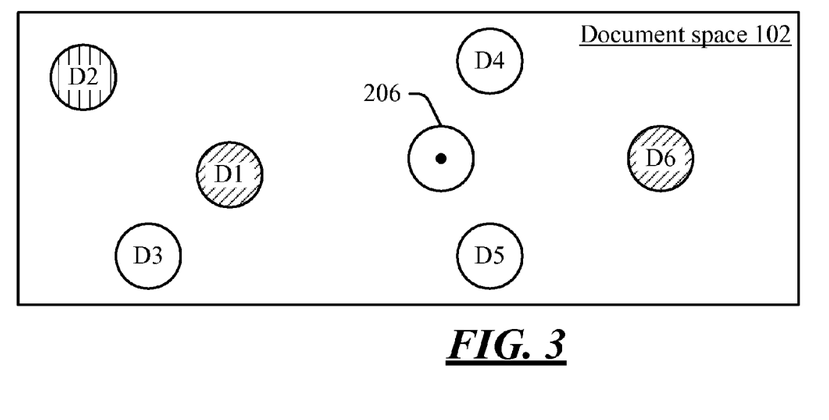
Figure 4:
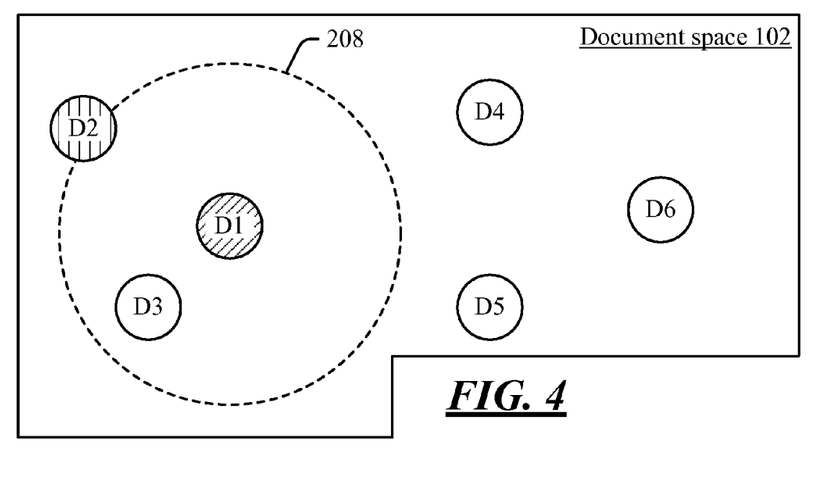

The system shown in FIG. 1 may be used with any criteria for selecting the next document to read. FIGS. 2-4 show example ways of choosing the next document to read. In each of FIGS. 2-4, there are six documents in a space, with the documents being labeled D1-D6, and the space being labeled as document space 102. In these examples, the first document to read is D1. D1 could be chosen, in any manner, as the first document to read. For example, in a pre-existing set of documents, D1 could be chosen based on its appearing first (or last) in chronological order. Or, in a dynamically-selected set of documents, D1 could be chosen based on its relevance score under a particular query. The foregoing are some examples, although the first document to be read could be chosen in any manner. Regardless of the manner in which the first document to read is chosen, the examples of FIGS. 2-4 presume that the first document chosen is D1. These figures then show, from that point forward, example ways of choosing the next document to read.

In FIG. 2, the document D1 (block 202) has been read, as indicated by diagonal-line pattern. Documents D1-D6 are shown at various points in document space 102 to indicate their relative similarity to each other. Similarity could be determined in any manner, such as by using a cosine similarity technique.

An example way to select the next document to read is to choose the document that is most dissimilar to the document that has just been read, or that is most dissimilar to a plurality of documents that have already been read. If a person is trying to obtain a large amount of information from the documents in a short time, then it makes sense to choose the next document in this way. Documents that are similar to the one(s) that have been read may tend to contain redundant information, so choosing a document that is dissimilar to the one(s) that have been read will tend to provide the reader with new information. In this sense, choosing a dissimilar document as the next one to read may maximize the information value obtained from reading the next document.

In the examples of FIGS. 2-4, document D6 is shown as being most dissimilar (i.e., least similar) to document D1. This dissimilarity is shown by the fact that document D6 has the greatest distance to document D1. Thus, in FIG. 2, document when document D1 is the only one that has been read, document D6 (block 204) is selected as the next document to read, as indicated by the vertical line pattern in the circle representing document D6.

FIG. 3 shows an example in which documents D1 and D6 have been read, and in which the next document to read is chosen. One way to select the next document would be to look only at the most-recently-read document—which, in this case, is D6—and to select the document that is most dissimilar to that document. In FIG. 3, D2 is most dissimilar to D6, so D2 could be selected as the document to read next. Another way to select the next document to read would be to find a representation of all documents that have been read (or a representation of some number of recently-read documents) and to choose a document that is dissimilar to that representation. For example, centroid 206 represents the combined content of documents D1 and D6, and the document that is most dissimilar to that centroid could be chosen as the next document to read. In the example of FIG. 3, the document that is most dissimilar to centroid 206 is, again, document D2. Thus, using this technique, document D2 would also be chosen as the next document to read.

The term centroid is normally used in geometry to describe the geometric center of a plane figure, or in physics to describe an object's center of mass or center of gravity. With reference to the notion of document similarity, centroid 206 refers to some combined representation two or more documents, so that the similarity of that combined representation may be compared with other documents. For example, if the content of a document were represented by a vector indicating the number of times that certain words appear in the document, then the centroid of two or more documents could represent some combination of the vectors representing those documents. The combination of vectors could be based on operations such as a union or sum of the vectors, an intersection, or any other technique. Thus, centroid 206 is a representation that may be found of the content of two or more documents, where this representation may be compared for similarity with other documents. In general, documents in a space may be compared for similarity (or dissimilarity) with some representative point in the space, where the representative point may be based solely on one document, or may be based on some combination of two or more documents (where centroid 206 is an example of a representative point based on such a combination).

In addition to choosing the document that is most dissimilar to the last document read (or that is most dissimilar to some point in the document space, such as a centroid), the next document could be chosen in other ways. For example, as shown in FIG. 4, the next document may be chosen to be the most dissimilar document within a defined constraint. Thus, if D1 has been read, then the next document chosen may be the document that is most dissimilar from D1, without exceeding limit 208. Choosing the document in this way may make sense if, for example, the reader of the documents is new to the subject and wants to obtain different information from each document read, while also having some overlap of content across documents in order to reinforce understanding of a new topic. Thus, while D6 is the document that is most dissimilar to D1 overall, D2 is the document that is most dissimilar to D1—among those documents whose dissimilarity to D1 falls within limit 208. While FIG. 4 shows an example in which limit 208 constrains how dissimilar the next document may be from a single document D1, such a limit could also be drawn around a centroid (or some other point that represents two or more documents), thereby limiting the dissimilarity between the next document and the centroid (or other point).

Limit 208 may be tuned to allow for various levels of dissimilarity. For example, the person reading the documents could set limit 208 to different values in order to choose how similar the next document will be to the document(s) that have already been read. While FIG. 4 shows an example in which limit represents a maximum amount of dissimilarity that will be tolerated in the next document, limit 208 could also represent a minimum amount of dissimilarity. Or, in another example, two limits could be set in order to define a range of similarity in which the next document falls. (E.g., the limits could indicate that the next document is to have at least X amount of similarity to the last document(s), but no more than Y amount of similarity.) In this way, a person could tune the process of choosing the next document based on that person's level of comfort with reading widely varied material and/or that person's tolerance for reading redundant material. In general, the document that is chosen may satisfy some condition as to its dissimilarity with a set of one or more other documents in a document space, where "most dissimilar," "most dissimilar within a limit," "having a level of dissimilarity that falls within a range," etc., are examples of such conditions.

A further way to choose the next document to read would be to detect clusters of documents, and to choose successive documents so as to cycle through the various clusters. Data mining techniques, or other techniques, could be used to identify groups of documents in a space that cluster around some substantive content. For example in the space shown in FIGS. 4-6, documents D1-D3 might be part of one cluster and documents D4-D6 might be part of another cluster. The clusters might be chosen based on substantive analysis of content in the documents, so that each cluster would contain a set of documents that are substantively similar to each other (but less substantively similar to documents in other clusters). Thus, chooser 116 (shown in FIG. 1) might start by choosing a document from the D1-D3 cluster, and then choose a document from the D4-D6 cluster as the next document. If there are more than two clusters, then one way to choose the next cluster would be to choose a document from the furthest (e.g., most dissimilar) cluster from the one that has already been read (or, if plural documents have already been read, the further cluster that does not contain a document that has already been read). In this example, dissimilarity between the current document and the next one is determined based on the documents being in different clusters, and thus documents' being members of different clusters is a further example of the "condition" on dissimilarity described above.

Figure 5:
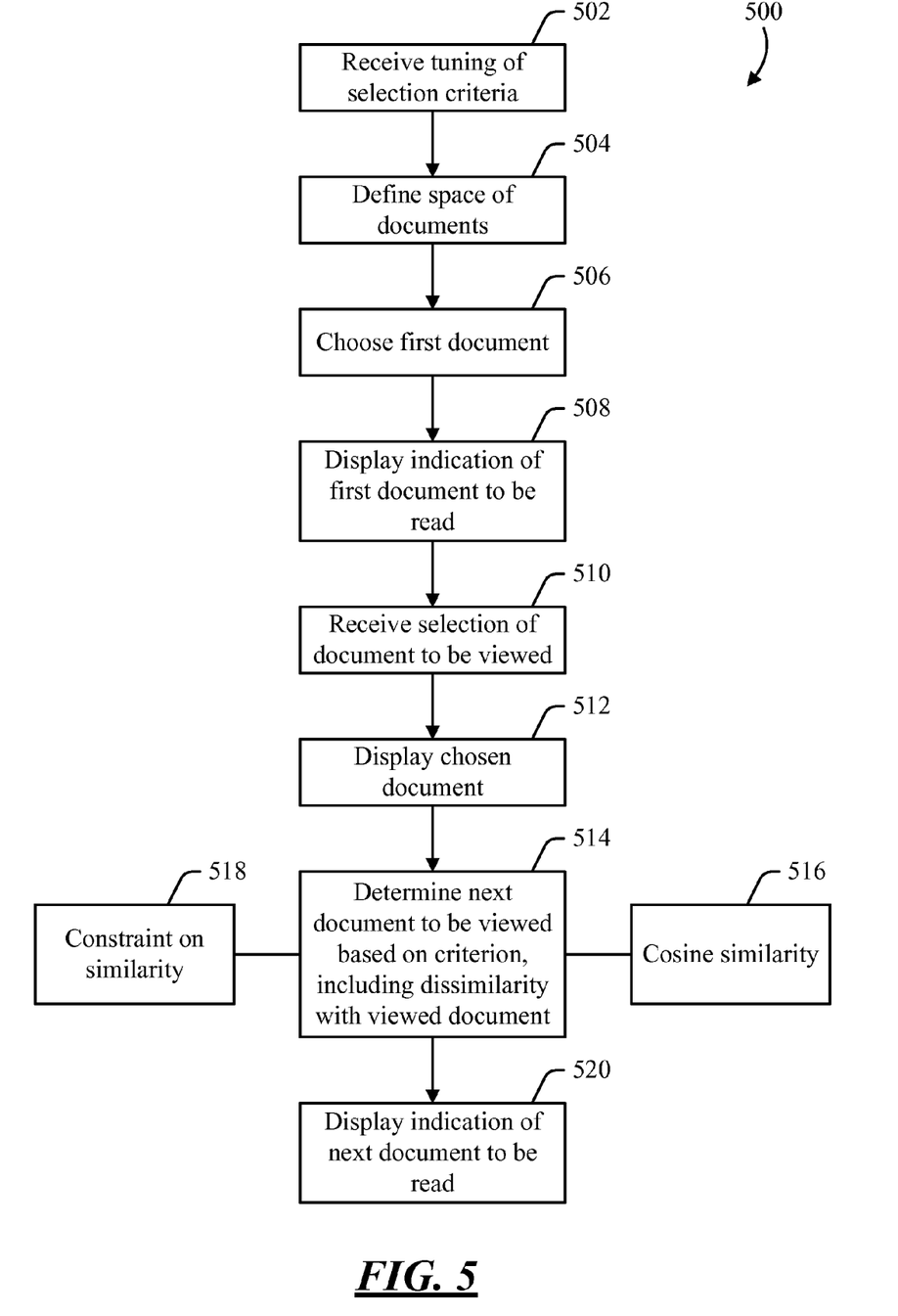
FIG. 5 is a flow diagram of an example process in which a set of documents may be read.

FIG. 5 shows, in the form of a flow chart, an example process 500 in which a set of documents may be read. Before turning to a description of FIG. 5, it is noted that each of the flow diagrams herein shows an example in which stages of a process are carried out in a particular order, as indicated by the lines connecting the blocks, but the various stages shown in these diagrams may be performed in any order, or in any combination or sub-combination.

At 502, a tuning may be received that determines the criteria for selecting the next document. For example, as described above in connection with FIG. 4, a person may provide a selection of a minimum and/or maximum amount of similarity (or dissimilarity) that the next document is to have relative to the document(s) that have been read. This tuning of the selection criteria may be received at 502.

At 504, the space of documents to be read may be defined. For example, as described above, the space of documents may be a pre-existing set of documents, or a set of documents identified dynamically through a search or through filtering techniques. Thus, at 504 a search may be performed or a particular pre-existing set of documents may be chosen.

At 506, the first document in the space is chosen. For example, in a search the documents are chosen based on their relevance to a query, so the document that has the highest relevance score against the query may be chosen for reading first. Similarly, in the case of documents that have been chosen using filtering techniques, a document that is determined by the filter to be particularly relevant may be chosen as the first document to read. In the case of a pre-existing collection of documents, the first document to read could be chosen based on chronological order within the collection, by selecting documents based on some substantive criteria (e.g., documents with words like "summary" or "synopsis" in their title or document type could be chosen for reading first, based on an assumption that such documents would be likely to give an overview of the contents of the collection), or randomly.

Regardless of which document is chosen, an indication may be displayed showing that the chosen document has been selected to be read first (at 508). The indication may take any form. For example, if a search result contains the Uniform Resource Locators (URLs) of documents in order of relevance to a query, then the indication that a particular document has been selected for first reading is that the document appears first on the list. In such an example, the system may then receive (at 510) a person's selection of the document to be viewed (e.g., by receiving an indication that the user has clicked a link to the document). The system may then display the chosen document (at 512). Another example way to indicate the first document chosen is simply to display the document itself. For example, if a person is reading collection of documents, the reading software could simply select a document to be read and then could display that document. In that case, showing the document on a screen would constitute both the display of a chosen document (at 512) as well as an indication of which document had been chosen for reading first (at 510). Alternatively, the user may explicitly indicate that he or she has read the paper.

At 514, it is determine which document is to be read next. The determination may be made based on one or more criteria, such as the next document's dissimilarity with a set of one or more document(s) that have already been viewed. As described above, cosine similarity (block 516) is one example technique that may be used to determine the level of similarity between documents, although similarity could be determined in any manner. Additionally, as noted above, there may be some constraint on how dissimilar the next document is from the last (block 518)—e.g., the next document selected because its similarity to document(s) that have previously been read falls within some minimum and/or maximum limit(s). The limits may be been defined as part of the tuning received at 502.

After the next document to be read has been chosen, an indication of that document is displayed (at 520). Various ways of indicating the first document to be read (at 508) are described above, and the next document to be read could be indicated in a similar way.

Figure 6:
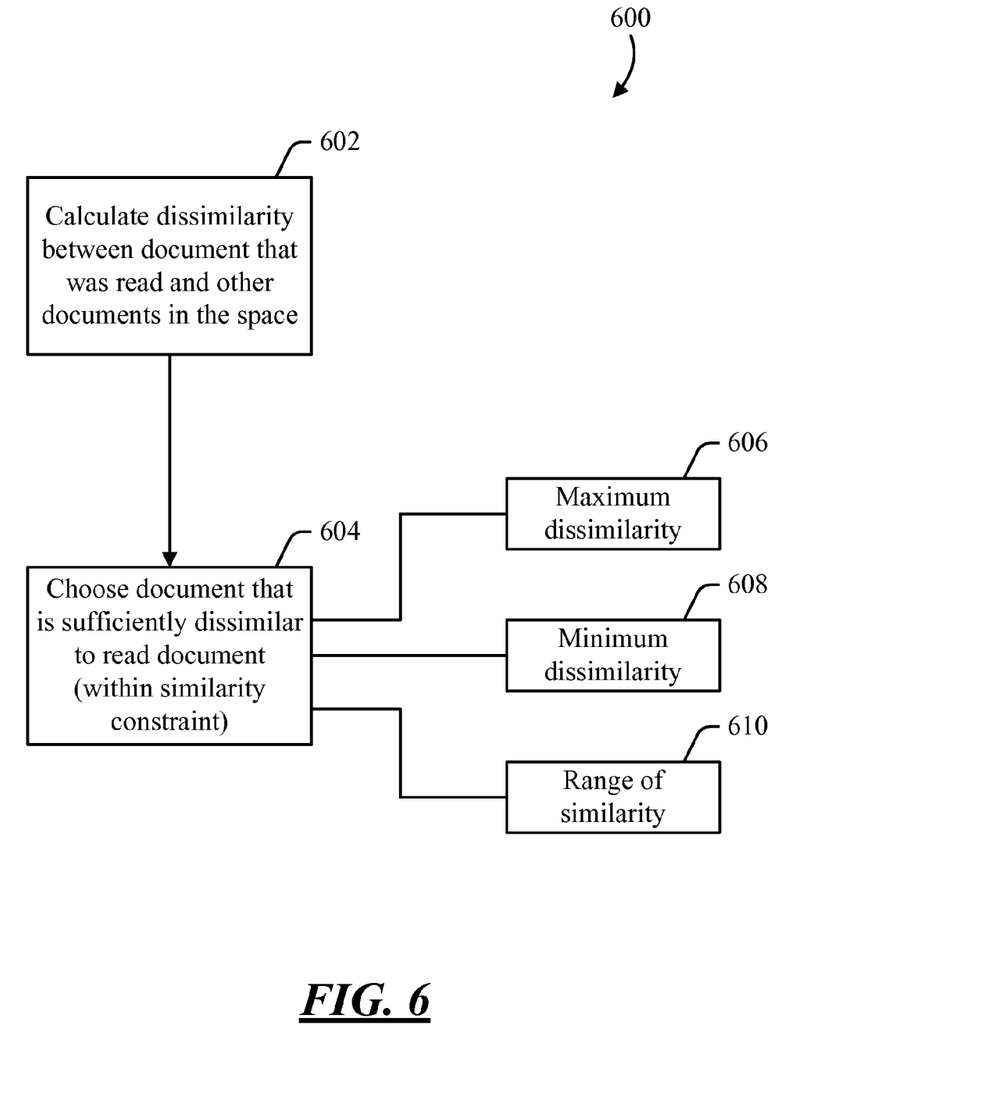
FIG. 6 is a flow diagram of an example process of determining the next document to be read.

As described above, the next document to be read may be determined based on the similarity (or lack thereof) between that document and documents that have already been read. FIG. 6 shows an example process 600 of determining the next document to be read based on considerations of similarity (or lack thereof).

At 602, the dissimilarity between a set of one or more document(s) that have been read, and other documents in the space, is calculated. If only one document has been read at the time the calculation is made, then the dissimilarity may be calculated based on the differences between that document and documents in the space that have not been read. Or, if more than one document has been read, then some combined representation (e.g., a centroid) of the documents that have been read could be used as a comparison point, and that point could be compared to other documents in the space that have not been read. As previously described, documents in a space could be clustered so that the choice of documents moves through the various clusters to give a reader exposure to each cluster. Also, as previously described, similarity could be calculated using a cosine similarity technique, but could also be calculated in any other way.

Based on the above-described calculation(s), a document is chosen that is sufficiently dissimilar to the document(s) that have been read (block 604). This choice may be made using one or more optional similarity constraints. The similarity constraint could be a limit on the maximum amount of dissimilarity that the chosen document may have relative to the previously-read document(s) (block 606). An example of this type of constraint is shown in FIG. 4, as described above. As another example, the similarity constraint could be a limit on the minimum amount of dissimilarity that the chosen document may have relative to the previously-read document(s) (block 608). As a further example, the similarity constraint could define a range of similarity, relative to the previously-read documents, into which the chosen document will fall (block 610). E.g., the chosen document may be chosen to be a document that is at least X amount, but no more than Y amount, dissimilar from previously-read documents.

Figure 7:
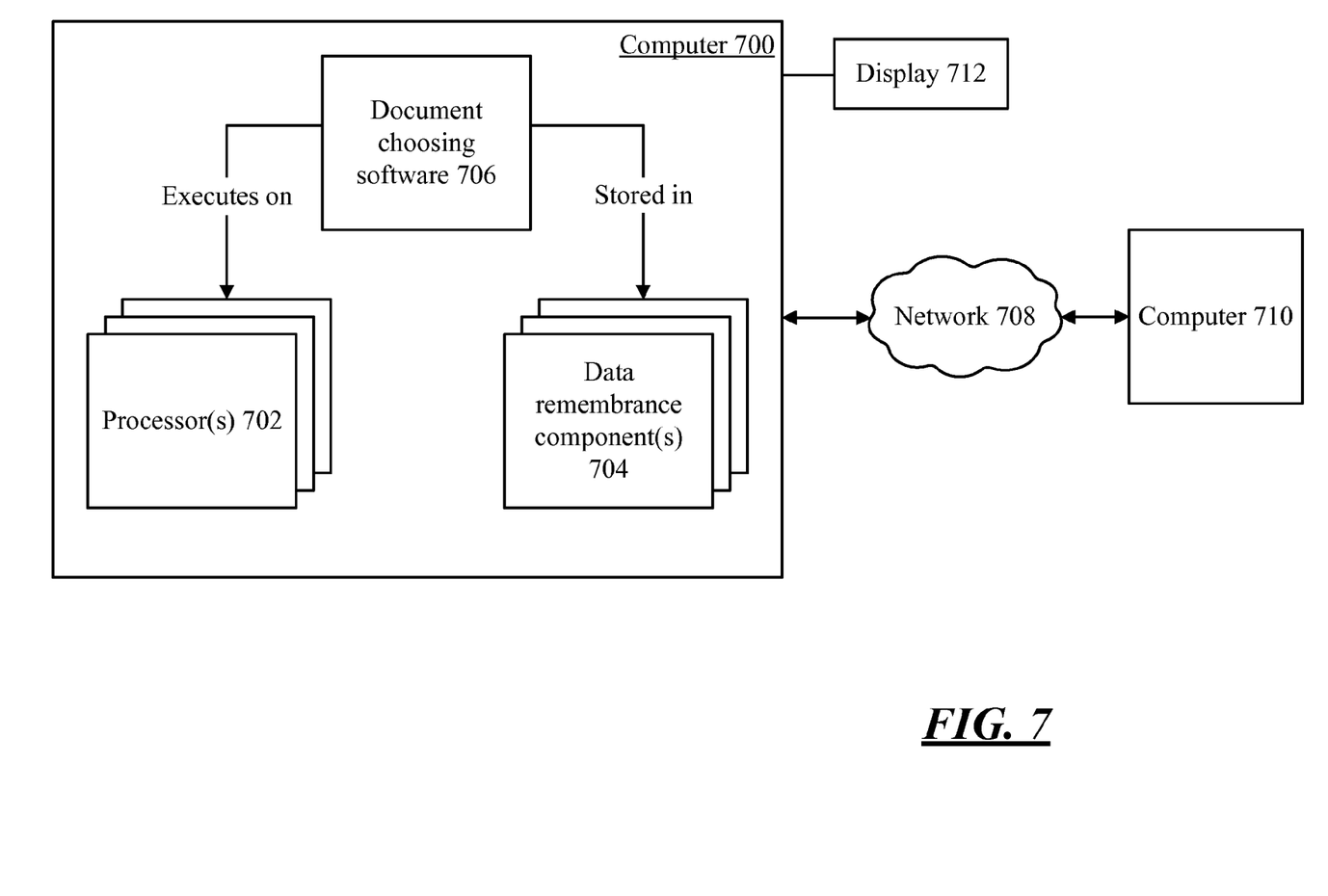
FIG. 7 is a block diagram of example components that may be used in connection with implementations of the subject matter described herein.

FIG. 7 shows an example environment in which aspects of the subject matter described herein may be deployed.

Computer 700 includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is document choosing software 706, which may implement some or all of the functionality described above in connection with FIGS. 1-6, although any type of software could be used. As one example, document choosing software 706 could implement chooser 116 (shown in FIG. 1), although document choosing software 706 is not limited to this example. Software 706 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as instructions that are stored on one or more computer-readable storage media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 702) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 700 may be communicatively connected to one or more other devices through network 708. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more tangible computer-readable media that store executable instructions that, when executed by a computer, cause the computer to perform acts comprising:
displaying an indication of a first document, said first document being in a document space;
determining, by using a chooser, a choice of a second document to be read based on there being a sufficient level of dissimilarity between (a) one or more documents that comprise said first document, and (b) documents in said document space other than said one or more documents;
finding a centroid that represents said one or more documents, said determining comprising comparing documents in said document space with said centroid; and
after said first document has been displayed, displaying said second document as a result of said second document's having been chosen by said chooser.

2. The one or more tangible computer-readable media of claim 1, further comprising:
using a cosine similarity technique to calculate said dissimilarity.

3. The one or more tangible computer-readable media of claim 1, wherein said determining is further based on a constraint as to a level of dissimilarity between said second document and said one or more documents.

4. The one or more tangible computer-readable media of claim 3, further comprising:
receiving said constraint from a person who is reading documents from said document space.

5. The one or more tangible computer-readable media of claim 3, wherein said constraint comprises a maximum amount of dissimilarity between said second document and said one or more documents.

6. The one or more tangible computer-readable media of claim 1, further comprising:
displaying a list of documents in said document space, wherein said indication of said first document comprises said first document's being first in said list.

7. The one or more tangible computer-readable media of claim 1, wherein said indication comprises displaying said first document.

8. The one or more tangible computer-readable media of claim 1, wherein said document space comprises documents that have been chosen using a filter.

9. The one or more tangible computer-readable media of claim 1, wherein documents in said document space comprise electronic representations of paper documents.

10. A system comprising:
a processor;
a data remembrance component;
a display on which an indication of a first document is displayed, and on which said first document is viewable by a person; and
a chooser that is executable on said processor, that is stored in said data remembrance component, and that chooses a second document from a document space based on said second document's having a sufficient level of dissimilarity from a set of one or more documents, said first document being among said set of one or more documents, said second document being displayed on said display after said first document as a result of having been chosen by said chooser,
said set having more than one document, said chooser determining dissimilarity between said set of one or more documents and other documents in said document space by finding a centroid that represents content of said one or more documents and by calculating dissimilarity between said centroid and documents in said document space.

11. The system of claim 10, wherein said chooser chooses said second document based on said second document's being more dissimilar to said set of one or more documents than any other document in said document space.

12. The system of claim 10, wherein said chooser chooses said second document based on said second document's being the most dissimilar to said set of one or more documents among those documents in said document space whose level of dissimilarity to said one or more documents does not exceed a limit.

13. The system of claim 10, wherein said system groups documents in said document space into clusters based on substantive analysis of content in the documents, and wherein said chooser chooses said second document based on said second document's being in a different cluster than said first document.

14. The system of claim 10, wherein said set contains said first document and no other document, and wherein said chooser determines said level of dissimilarity between said set and documents in said document space by comparing said first document with document said document space.

15. A method of determining an order in which to read a plurality of documents, the method comprising:
using a processor to perform acts comprising:
displaying a first document in a document space;
calculating dissimilarity between a representative point in said document space and documents in said document space, wherein, at a time of said calculating, a plurality of documents in said document space, including said first document, have been displayed;
identifying, using a chooser, a second document in said document space as satisfying a condition as to said second document's level of dissimilarity to said representative point, said condition comprising that said second document has a sufficient level of dissimilarity from said representative point;
receiving a selection of said second document;
displaying said second document after said first document based on said second document having been found to have said sufficient level of dissimilarity from said representative point, and based on said second document's having been identified by said chooser: and
finding a centroid based on said plurality of documents, said representative point being said centroid.

16. The method of claim 15, wherein said representative point is said first document.

17. The method of claim 15, wherein said documents in said document space are grouped into clusters based on substantive analysis of content in said documents, wherein said condition comprises said first document and said second document being members of different clusters, and wherein said identifying comprises:
determining that said second document is in a different cluster than said first document.

* * * * *